US006623782B2

(12) United States Patent
Hori et al.

(10) Patent No.: US 6,623,782 B2
(45) Date of Patent: Sep. 23, 2003

(54) PROCESS FOR PRODUCING POPCORN

(75) Inventors: Toshiro Hori, Yokkaichi (JP); Hajime Nasaka, Yokkaichi (JP); Tomoharu Kato, Yokkaichi (JP); Nagahiro Yamazaki, Yokkaichi (JP)

(73) Assignee: Taiyo Kagaku Co., Ltd., Yokkaichi (JP)

( * ) Notice: Subject to any disclaimer, the term of this patent is extended or adjusted under 35 U.S.C. 154(b) by 48 days.

(21) Appl. No.: 09/942,705

(22) Filed: Aug. 31, 2001

(65) Prior Publication Data

US 2003/0049362 A1 Mar. 13, 2003

(51) Int. Cl.$^7$ .............. A23D 9/007; A23L 1/18
(52) U.S. Cl. ............. 426/625; 426/93; 426/309; 426/611; 426/625
(58) Field of Search ............... 426/89, 93, 99, 426/302, 305, 309, 611, 612, 625

(56) References Cited

U.S. PATENT DOCUMENTS

| 5,362,504 | A | * | 11/1994 | Kamper et al. ............... 426/89 |
| 5,997,916 | A | * | 12/1999 | Dickerson et al. ............ 426/74 |
| 6,013,291 | A | * | 1/2000 | Glass et al. .................... 426/74 |
| 6,210,721 | B1 | * | 4/2001 | Dickerson et al. ............ 426/74 |
| 6,258,398 | B1 | * | 7/2001 | Okada et al. ............... 426/607 |
| 6,444,253 | B1 | * | 9/2002 | Conklin et al. ............. 426/651 |
| 2001/0028914 | A1 | * | 10/2001 | Okada et al. ............... 426/603 |

* cited by examiner

*Primary Examiner*—Carolyn Paden
(74) *Attorney, Agent, or Firm*—Birch, Stewart, Kolasch & Birch, LLP

(57) ABSTRACT

A process for producing popcorn comprising the steps of (a) mixing a polyglycerol fatty acid ester having an HLB of 10 or less made from a polyglycerol having an average degree of polymerization of 2 to 6 and oleic acid, an edible fat or oil and corn as raw materials; and (b) heating the mixture obtained in step (a) to give popcorn.

10 Claims, No Drawings

PROCESS FOR PRODUCING POPCORN

BACKGROUND OF THE INVENTION

1. Field of the Invention

The present invention relates to popcorn and a process for producing the popcorn. More specifically, the present invention relates to popcorn in which burns or sticking of popcorns with each other is not caused during the heating step of the process and give excellent taste and palatability, and a process for producing the popcorn.

2. Discussion of the Related Art

Popcorn is obtained by thermally expanding corn, and eaten as snack foods. When the corn is heated, the adhesion to a griddle or a container or the adhesion of popcorns with each other by paste-formation of the starches in the corn along with expansion of the corn is likely to be caused. Therefore, the edible fat or oil has been used in the process of producing popcorn. The edible fat or oil has been used for the purposes of leveling thermal energy during production of the popcorn, promoting thermal retention strength, thereby aiding the thermal expansion of the corn, and preventing the adhesion to the griddle or the container or the adhesion of the popcorns with each other during the production of the popcorn.

However, since a general edible fat or oil has a weak adhesion-preventive effect, the popcorn is likely to be burned, and the popcorns easily stick with each other. If this problem were to be conventionally solved, the amount of the edible fat or oil used becomes large, so that the taste and the palatability of foods are impaired, so that satisfactory effects cannot be obtained.

Especially in recent years, popcorn foods which can be readily eaten by directly heating a heat-resisting container charged with popcorn raw materials such as corn, a fat or oil, and seasonings over a stove for households, with a microwave oven or the like, have been made commercially available. However, the popcorn foods have the problems of causing excessive use of the fat or oil and burns due to partial heating.

An object of the present invention is to provide popcorn having extremely excellent properties in preventing the adhesion, causing no burns and stickiness of the popcorns with each other, and having excellent taste and palatability, and a process for producing the popcorn.

These and other objects of the present invention will be apparent from the following description.

SUMMARY OF THE INVENTION

According to the present invention, there are provided:

[1] a process for producing popcorn comprising the steps of:
  (a) mixing a polyglycerol fatty acid ester having an hydrophilic lipophilic balance ("HLB") of 10 or less made from a polyglycerol having an average degree of polymerization of 2 to 6 and oleic acid, an edible fat or oil and corn as raw materials; and
  (b) heating the mixture obtained in step (a) to give popcorn; and

[2] popcorn obtained by the process of item [1].

DETAILED DESCRIPTION OF THE INVENTION

In the present invention, step (a) comprises mixing a specified polyglycerol fatty acid ester, an edible fat or oil and corn with each other.

The term "polyglycerol" is a polyglycerol having an average degree of polymerization of 2 to 6, preferably 2 to 5, more preferably 2 to 4. Examples of the polyglycerol include diglycerol, triglycerol, tetraglycerol, and hexaglycerol. The term "average degree of polymerization" as referred to herein is a value which is calculated on the basis of its hydroxyl value. In addition, the lower the content of the glycerol in the composition of the polyglycerol used in the present invention, the better. When the content of the glycerol is 20% by weight or less, the resulting composition can be aptly subject to practical use. When the content of the glycerol is 5% by weight or less, it is more preferable, because the smoking amount of the polyglycerol is even smaller. In a case of a polyglycerol fatty acid ester obtained from a polyglycerol having an average degree of polymerization exceeding 6, the solubility of the polyglycerol fatty acid ester in the edible fat or oil becomes drastically poor, so that the effects of the present invention cannot be obtained.

In the present invention, the term "oleic acid" preferably refers to one usually obtained by hydrolyzing and purifying rapeseed oil, soybean oil, palm oil, or the like, and those containing a small amount of a saturated fatty acid such as palnitic acid or stearic acid, a higher unsaturated fatty acid such as linoleic acid, or the like can be utilized depending upon the extent of the purification. When the amount of the saturated fatty acid is too large, the fluidity of the edible fat or oil becomes drastically poor, so that the effects of the present invention cannot be obtained. On the other hand, when the amount of the higher unsaturated fatty acid is too large, the flavor of the popcorn is drastically impaired due to thermal deterioration during storage and cooking, thereby making it difficult to be used for practical purposes.

In the present invention, the term "polyglycerol fatty acid ester" refers to a polyglycerol fatty acid ester having an HLB of 10 or less, preferably 2 to 10, more preferably 3 to 7, which is obtained by esterification of the above-mentioned polyglycerol with the above-mentioned oleic acid by a conventional method. The polyglycerol fatty acid ester is, for instance, one or more polyglycerol fatty acid esters such as diglycerol monooleate, diglycerol dioleate, triglycerol monooleate, triglycerol trioleate, hexaglycerol dioleate, and hexaglycerol hexaoleate. When the polyglycerol fatty acid ester has an HLB exceeding 10, the solubility of the polyglycerol fatty acid ester to the edible fat or oil becomes drastically poor, so that the effects of the present invention cannot be obtained. The term HLB as used herein refers to an index for hydrophilic-lipophilic balance as determined by HLB determination method described on pages 21–23 of "Food Emulsions" (edited by Kare Larsson and Stig E. Friberg published by MARCEL DEKKER INC. (1990)). The polyglycerol fatty acid ester obtained after the esterification reaction can be subjected to a purification treatment such as deacidification, a step of removing a catalyst, decoloration, or deodorization.

The amount of the polyglycerol fatty acid ester formulated is preferably from 0.1 to 10 parts by weight, more preferably from 0.5 to 10 parts by weight, still more preferably from 0.5 to 5 parts by weight, based on 100 parts by weight of the edible fat or oil. When the amount formulated is less than 0.1 parts by weight, a sufficient effect cannot be exhibited, and when the amount formulated exceeds 10 parts by weight, it is disadvantageous in costs.

In the present invention, the term "edible fat or oil" refers to a fat or oil used in production of the popcorn, especially to a fat or oil used when heating with a microwave oven the fat or oil together with corn in a container such as a sack. The fat or oil can be general edible fats or oils such as palm oil, rapeseed oil, corn oil, and lard oil as well as butter and various seasoning oils. In addition, as flavoring, table salt, sugars, spices, seasonings, perfumes, food colors and the like can be added to the mixture as desired.

The amount of the edible fat or oil formulated is preferably from 5 to 30 parts by weight, more preferably from 5 to 25 parts by weight, still more preferably from 10 to 25 parts by weight, based on 100 parts by weight of the corn in a dry state. When the amount of the edible fat or oil formulated is less than 5 parts by weight, the popcorn is adhered to a griddle, a container, or the like, and the popcorns are likely to stick with each other and burns are likely to be caused. When the amount formulated exceeds 30 parts by weight, the edible fat or oil sticks to popcorn, and the popcorn having excellent taste and palatability cannot be obtained because the flavor of the fat or oil is too strong.

In the present invention, the term "corn" is generally a seed of corn used for popcorn, and is not particularly limited.

In step (a), each of the polyglycerol fatty acid ester, the edible fat or oil and the corn can be separately mixed, or alternatively, the edible fat or oil previously containing the polyglycerol fatty acid ester can be mixed with the corn. The edible fat or oil containing the polyglycerol fatty acid ester is mixed in an amount of preferably from 5 to 30 parts by weight, more preferably from 5 to 25 parts by weight, based on 100 parts by weight of the corn in a dry state.

Further, in step (a), in addition to the polyglycerol fatty acid ester, it is preferable to mix lecithin, methyl silicone or a mixture thereof with the mixture.

In the present invention, the term "lecithin" refers to one obtained by purifying from soybean, egg yolk, rapeseed or the like to be obtained as soybean lecithin, egg yolk lecithin, rapeseed lecithin or the like, which can be subjected to a purification treatment such as delipidation, decoloration, or deodorization.

The amount of the lecithin formulated is preferably from 0.1 to 5 parts by weight, more preferably from 0.5 to 5 parts by weight, still more preferably from 0.5 to 3 parts by weight, based on 100 parts by weight of the edible fat or oil. When the amount of the lecithin formulated is less than 0.1 parts by weight, its effects cannot be sufficiently exhibited. On the other hand, when the amount formulated exceeds 5 parts by weight, it is undesirable because the popcorn is likely to be colored, smoked or burned.

In the present invention, the term "methyl silicone" refers to a dimethyl polysiloxane, which is usually obtained as a silicone resin or a silicone oil, and its production steps are not particularly limited.

The amount of the methyl silicone formulated is preferably from 0.0005 to 0.005 parts by weight, more preferably from 0.0007 to 0.005 parts by weight, still more preferably from 0.001 to 0.005 parts by weight, based on 100 parts by weight of the edible fat or oil.

Each of the lecithin, methyl silicone or a mixture thereof can be separately mixed with corn, or alternatively, each can be contained in the edible fat or oil together with the polyglycerol fatty acid ester to mix with corn. The edible fat or oil containing these ingredients is mixed in an amount of preferably from 5 to 30 parts by weight, more preferably from 5 to 25 parts by weight, based on 100 parts by weight of the corn in a dry state.

In the present invention, step (b) comprises heating the mixture obtained in step (a).

In step (b), the heating means is not particularly limited, as long as the corn can be thermally expanded. For instance, when the corn is placed in a grain expansion machine comprising an iron pot and a freely openable lid made of a packing material, heat can be applied at 200° to 240° C. for 20 to 120 seconds. When the corn is placed on a heat-resisting dish such as metal flying pan and directly heated with a stove or the like, heat can be applied at 170° to 200° C. for 2 to 10 minutes. When the corn is placed in a paper container or the like, heat can be applied with a microwave oven at an output of 500 to 600 W for 2 to 10 minutes.

The edible fat or oil used in present invention has a fat or oil film-forming ability even when used alone. However, when the edible fat or oil contains the polyglycerol fatty acid ester, the extensibility of the edible fat or oil over the popcorn surface becomes excellent, whereby a further strengthened fat or oil-film forming ability can be obtained. Therefore, in the popcorn of the present invention produced by mixing the edible fat or oil and the polyglycerol fatty acid ester, with corn, the fat or oil containing the polyglycerol fatty acid ester thinly and evenly forms a fat or oil film over the popcorn surface, so that the adhesion of the popcorn to a griddle or a container, and the adhesion of popcorns with each other are suppressed, whereby the popcorns are not burned nor the popcorns stick to each other.

In addition, since the edible fat or oil contains the polyglycerol fatty acid ester, the amount of the fat or oil used during the production of popcorn can be reduced, so that the oxidative deterioration odor of the oil caused by heating or storage can be reduced, whereby the taste of the popcorn is not impaired and excellent palatability can be enjoyed for a long period of time.

EXAMPLES

The present invention will be explained in further detail by means of the following examples, without intending to limit the scope or spirit of the present invention thereto.

Example 1

Five grams of corn oil containing 1% by weight of diglycerol monooleate (HLB =7) was added to 100 g of corn (popcorn seed) for producing popcorns in a heat-resisting dish, and mixed so that the corn became more compatible with the oil. Thereafter, the heat-resisting dish was heated over a stove at 200° C. for 5 minutes, to give popcorns.

Example 2

The same procedures as in Example 1 were carried out except for the use of 5 g of corn oil containing 1% by weight of diglycerol dioleate (HLB 5), to give popcorns.

Example 3

The same procedures as in Example 1 were carried out except for the use of 5 g of corn oil containing 1% by weight of triglycerol monooleate (HLB =10), to give popcorns.

Example 4

The same procedures as in Example 1 were carried out except for the use of 5 g of corn oil containing 1% by weight of hexaglycerol trioleate (HLB =7) and 1% by weight of lecithin, to give popcorns.

Example 5

The same procedures as in Example 1 were carried out except for the use of 5 g of corn oil containing 1% by weight of hexaglycerol hexaoleate (HLB =4) and 1% by weight of lecithin, to give popcorns.

Example 6

The same procedures as in Example 1 were carried out except for the use of 5 g of corn oil containing 1% by weight of hexaglycerol trioleate (HLB =7) and 1% by weight of lecithin, and 0.005% by weight of methyl silicone, to give popcorns.

Example 7

Two grams of palm oil containing 0.1% by weight of diglycerol monooleate (HLB =7) was added to 20 g of corn (popcorn seed) for producing popcorns in a paper sack, and mixed so that the corn became more compatible with the oil. Thereafter, the mixture was heated with a microwave oven for 5 minutes, to give popcorns.

Example 8

The same procedures as in Example 7 were carried out except for the use of 2 g of palm oil containing 10% by weight of diglycerol monooleate (HLB =7), to give popcorns.

Example 9

The same procedures as in Example 7 were carried out except for the use of 2 g of palm oil containing 0.1% by weight of diglycerol monooleate (HLB =7) and 0.1% by weight of lecithin, to give popcorns.

Example 10

The same procedures as in Example 7 were carried out except for the use of 2 g of palm oil containing 0.1% by weight of diglycerol monooleate (HLB 7), 0.1% by weight of lecithin and 0.001% by weight of methyl silicone, to give popcorns.

Comparative Example 1

Five grams of corn oil was added to 100 g of corn (popcorn seed) for producing popcorns in a heat-resisting dish, and mixed and heated in the same manner as in Example 1, to give popcorns.

Comparative Example 2

The same procedures as in Comparative Example 1 were carried out except that the amount of the corn oil was changed to 30 g, to give popcorns.

Comparative Example 3

The same procedures as in Example 1 were carried out except for the use of 5 g of corn oil containing 1% by weight of hexaglycerol monooleate (HLB =11), to give popcorns.

Comparative Example 4

The same procedures as in Example 1 were carried out except for the use of 5 g of corn oil containing 1% by weight of lecithin, to give popcorns.

Comparative Example 5

The same procedures as in Example 1 were carried out except for the use of 5 g of corn oil containing 5% by weight of lecithin, to give popcorns.

Comparative Example 6

The same procedures as in Example 1 were carried out except for the use of 5 g of corn oil containing 0.005% by weight of methyl silicone, to give popcorns.

Comparative Example 7

Two grams of palm oil was added to 20 g of corn (popcorn seed) for producing popcorns in a paper sack, and mixed and heated with a microwave oven in the same manner as in Example 7, to give popcorns.

Comparative Example 8

The same procedures as in Comparative Example 7 were carried out except that the amount of the palm oil was changed to 6 g, to give popcorns.

Comparative Example 9

The same procedures as in Example 7 were carried out except for the use of 2 g of palm oil containing 10% by weight of hexaglycerol monooleate (HLB =11), to give popcorns.

Comparative Example 10

The same procedures as in Example 7 were carried out except for the use of 2 g of palm oil containing 5% by weight of lecithin, to give popcorns.

Comparative Example 11

The same procedures as in Example 7 were carried out except for the use of 2 g of palm oil containing 0.005% by weight of methyl silicone, to give popcorns.

Test Example 1

The burns of each of the resulting popcorns obtained in Examples 1 to 10 and Comparative Examples 1 to 11, the stickiness of the popcorns themselves, and the taste and the palatability of the popcorns were evaluated.

The burns of the popcorns are evaluated by comparing the burned state as follows.

Score 10: burns not being found;
Score 8: some brownish coloring being found;
Score 5: brownish coloring being found; and
Score 3: slightly burns being found; and
Score 0: burns being clearly found.

The score for the burns is shown as an average value of 20 panelists.

The stickiness of the popcorns to each other is evaluated by comparing the number of the stuck popcorns in proportion to the entire number of popcorns (about 100 popcorns) as follows.

Score 10: stickiness not being found;
Score 8: 2 to 3 popcorns sticking with each other in a few places;
Score 5: 2 to 3 popcorns sticking with each other in many places;
Score 3: 4 to 9 popcorns sticking with each other; and
Score 0: 10 or more popcorns sticking with each other.

The score for the stickiness is shown as an average value of 20 panelists.

The taste and the palatability of the popcorns are each evaluated as follows:

Score 10: very good;
Score 8: good;
Score 7: slightly good;
Score 5: normal;
Score 3: slightly poor;
Score 2: poor; and
Score 0: very poor.

The scores for the taste and the palatability was shown as an average value of 20 panelists.

The results are shown in Table 1.

TABLE 1

|  | Burns | Stickiness | Taste | Palatability |
|---|---|---|---|---|
| Example 1 | 10.0 | 10.0 | 7.1 | 9.2 |
| Example 2 | 10.0 | 10.0 | 7.0 | 9.2 |
| Example 3 | 10.0 | 10.0 | 6.7 | 9.0 |
| Example 4 | 10.0 | 10.0 | 6.2 | 9.0 |
| Example 5 | 10.0 | 10.0 | 6.1 | 9.5 |
| Example 6 | 10.0 | 10.0 | 6.1 | 9.7 |
| Example 7 | 10.0 | 8.4 | 6.9 | 8.7 |
| Example 8 | 10.0 | 9.2 | 6.9 | 8.5 |
| Example 9 | 10.0 | 9.1 | 6.0 | 9.4 |
| Example 10 | 10.0 | 10.0 | 6.0 | 9.7 |
| Comparative Example 1 | 1.7 | 0.5 | 5.0 | 5.0 |
| Comparative Example 2 | 3.9 | 4.2 | 3.1 | 4.1 |
| Comparative Example 3 | 3.7 | 5.5 | 4.8 | 5.5 |
| Comparative Example 4 | 2.8 | 1.1 | 3.7 | 4.7 |
| Comparative Example 5 | 2.2 | 0.7 | 2.0 | 4.5 |
| Comparative Example 6 | 4.6 | 1.5 | 4.7 | 4.2 |
| Comparative Example 7 | 0.9 | 0.2 | 4.0 | 3.4 |
| Comparative Example 8 | 2.7 | 0.5 | 1.9 | 1.1 |
| Comparative Example 9 | 2.9 | 1.2 | 4.5 | 5.4 |
| Comparative Example 10 | 2.2 | 0.2 | 2.5 | 1.5 |
| Comparative Example 11 | 1.4 | 1.0 | 2.4 | 1.7 |

It is clear from Table 1 that the inventive products have no burns of popcorns, no stickiness of the popcorns with each other, and excellent taste and palatability as popcorns, as compared to the comparative products.

What is claimed is:

1. A process for producing popcorn comprising the steps of:
   (a) mixing a polyglycerol fatty acid ester having an HLB of 10 or less made from a polyglycerol having an average degree of polymerization of 2 to 6 and having a glycerol content of 20% by weight or less and oleic acid, an edible fat or oil and corn as raw materials, wherein 5 to 30 parts by weight of the edible fat or oil is mixed based on 100 parts by weight of the corn and 0.1 to 10 parts by weight of the polyglycerol fatty acid ester is mixed based on 100 parts by weight of the edible fat or oil; and
   (b) heating the mixture obtained in step (a) to give popcorn.

2. The process according to claim 1, wherein lecithin, methyl silicone or a mixture thereof is also mixed as one of the raw materials in step (a).

3. The process according to claim 1, wherein the step (a) is carried out by mixing the edible fat or oil containing the polyglycerol fatty acid ester with corn.

4. The process according to claim 3, wherein the polyglycerol fatty acid ester is contained in an amount of from 0.1 to 10 parts by weight, based on 100 parts by weight of the edible fat or oil.

5. The process according to claim 3, wherein the lecithin is contained in an amount of from 0.1 to 5 parts by weight, based on 100 parts by weight of the edible fat or oil.

6. The process according to claim 3, wherein the methyl silicone is contained in an amount of from 0.0005 to 0.005 parts by weight, based on 100 parts by weight of the edible fat or oil.

7. The process according to claim 2, wherein the step (a) is carried out by mixing the edible fat or oil containing the polyglycerol fatty acid ester and at least one compound selected from the group consisting of lecithin and methyl silicone, with corn.

8. The process according to claim 7, wherein the polyglycerol fatty acid ester is contained in an amount of from 0.1 to 10 parts by weight, based on 100 parts by weight of the edible fat or oil.

9. Popcorn obtained by any one of the processes of claims 1, 2, 7, 3, 8, 4, 5, and 6.

10. The process according to claim 1, wherein said edible fat or oil is selected from the group consisting of palm oil, rapeseed oil, corn oil, lard oil, butter and seasoning oil.

* * * * *